United States Patent [19]

Evard

[11] 3,772,729
[45] Nov. 20, 1973

[54] CLEANING MECHANISM FOR VEHICLE HEADLAMPS

[76] Inventor: Willy Evard, 19 place des Tilleuls, Andenne, Belgium

[22] Filed: Feb. 1, 1972

[21] Appl. No.: 222,555

[30] Foreign Application Priority Data
Feb. 2, 1971 Belgian.................762.425

[52] U.S. Cl............................ 15/250.22, 15/250 A
[51] Int. Cl. .............................................. B60s 1/44
[58] Field of Search..................... 15/250.22, 250 A

[56] References Cited
UNITED STATES PATENTS

| | | | |
|---|---|---|---|
| 2,288,429 | 6/1942 | Baughn............................. | 15/250 A |
| 3,608,123 | 9/1971 | Champigny....................... | 15/250 A |
| 3,641,613 | 2/1972 | Pouilaitis et al. ................. | 15/250 A |
| 3,599,269 | 8/1971 | Congdon........................... | 15/250 A |

FOREIGN PATENTS OR APPLICATIONS

| 662,077 | 4/1963 | Canada............................. | 15/250 A |

Primary Examiner—Leon G. Machlin
Attorney—Richard C. Sughrue et al.

[57] ABSTRACT

A cleaning mechanism for vehicle headlamps, in particular for motor cars, comprises cleaning means, provided in particular by a movable element such as a brush or squeegee, moving over the outer face of the headlamp glass and means, such as helix shaped arms, rotating around a stem supported on the headlamp glass, being provided in order to cause the rotation of such element facing the headlamp glass by the force of the wind resulting from the advance motion of the vehicle.

7 Claims, 2 Drawing Figures

CLEANING MECHANISM FOR VEHICLE HEADLAMPS

The present invention has for its object a cleaning mechanism for vehicle headlamps, in particular for motor-cars, comprising at least one movable cleaning element able to move over the outer face of a headlamp glass.

The mechanisms of this kind known up to the present are of "wind-screen wiper" type and have the disadvantage of mandatorily requiring to be driven by a motor which it is generally necessary to mount close to the headlamp. In the case of certain makes of cars, this may cuase considerable difficulties, considering that they do not always provide the space needed for mounting the driving motor. Moreover, it is necessary to provide a number of different models of such mechanisms in order to enable them to be mounted on any type of motor-car.

For this purpose, the cleaning mechanism according to the invention comprises means permitting to cause the rotation of the cleaning elment facing the headlamp glass by means of the force of the wind set up by the advance of the vehicle.

Advantageously, the cleaning element is of helix shape comprising at least one arm rotating around an axis substantially at right angles to the headlamp glass, the side of the said arm facing the glass being provided with a cleaning member, such as a brush, a squeegee.

According to a preferred embodiment, the mechanism comprises means enabling to adjust automatically the pressure with which the cleaning element is applied against the headlamp glass as well as the speed of rotation of such element.

A particular constructional embodiment of a cleaning mechanism according to the present invention will now be described by way of example with reference to the accompanying drawings, in which.

Figure 1:
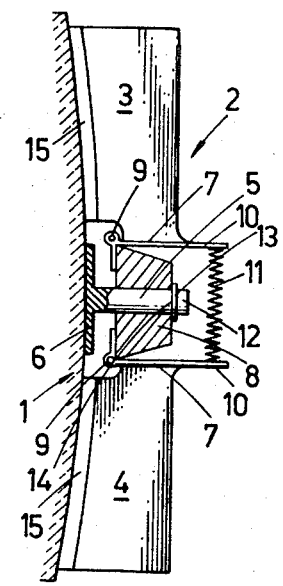
FIG. 1 is a side-face view, partially broken away, of a headlamp glass of a vehicle provided with a cleaning mechanism according to the invention.
Figure 2:
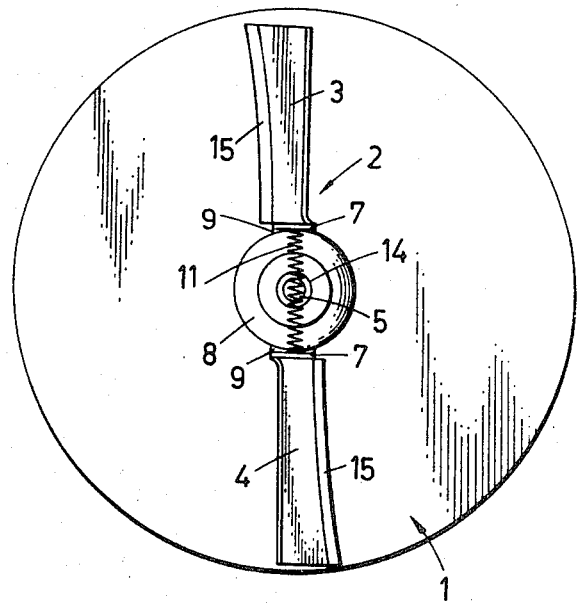
FIG. 2 is an elevational view of the headlamp glass and of the cleaning mechanism shown in FIG. 1.

The said figures show a convex glass 1 of circular shape of a vehicle headlamp, not shown, on which is mounted a cleaning mechanism 2.

This mechanism comprises two helix shaped arms 3 and 4 extending in the extension of one another on either side of a stem 5 mounted on a support 6 glued to the centre of the outer face of glass 1. The arms 3 and 4 are able to rotate freely around the stem 5, the latter extending at right angles to the glass 1.

Each of these arms 3 and 4 comprises a blade which is inclined with reference to the glass 1, in contrary direction one to the other so as to provide a helix able to rotate by the force of the wind around the stem 5.

The rims of these arms 3 and 4 directed towards the glass 1 are provided with a squeegee 15 fitted to move over the glass 1 for cleaning the latter.

Each of the ends of the arms 3 and 4 directed towards one another are secured to an intermediate component 7 having the shape of an elongated plate and extending in its longitudinal direction, along the axis of the stem 5. At its end positioned close to the squeegee 15, this intermediate component 7 is hinged on a hub 8, rotating freely around the stem 5, by means of a hinge 9 or any other similar member allowing each of the arms 3 and 4 to rotate around an axis positioned within a plane substantially at right angles to the axis of stem 5.

The swivelling axes of the two arms 3 and 4 are parallel and positioned on either side of the stem 5. These hinges 9 enable the arms 3 and 4 to spread out from or to close up to the outer face of glass 1.

The end 10 of the intermediate component opposite the end carrying the hinge 9 juts out with reference to the arms 3 and 4.

A spring 11 connects the two ends 10 projecting from the intermediate components 7.

The hub 8 is mounted in a removable manner on the stem 5. The free end 12 of the latter comprises an annular recess 13 extending around the axis of stem 5 wherein is positioned a holding component 14 provided by a steel wire bent into the shape of a U, this component 14 arresting the stem 5 in the recess 13 in order to hold the hub 8 and, consequently, the cleaning element 2 on the stem 5.

In order to remove the cleaning element 2 from the headlamp it will be, therefore, sufficient to remove the holding component 14 and to slide the hub 8, carrying the arms 3 and 4, from the stem 5.

The arms 3 and 4 and even the support 6, the stem 5 and the hub 8 are preferably produced in a material permeable to light, such as a transparent or translucent plastice material so as not to diminish the efficiency of the headlamp.

The operation of the cleaning mechanism for the headlamp glass is as follows:

Due to its helix shape, the cleaning element 2 is able to rotate around the stem 5 by the mere force of the wind set up by the advance of the vehicle carrying such mechanism on its headlights without the supply of any other energy, such as that of a driving motor being necessary, as is the case of the said known mechanisms.

By virtue of the centrifugal force, the free ends 10 of the intermediate components 7, on which are fastened the arms 3 and 4, tend to spread apart from one another, which results in the arms 3 and 4 and, therefore, the squeegees 15 being applied against the surface of the glass 1. By this application of the squeegees 15 against the glass 1, the rotary motion by the force of the wind of the arms 3 and 4 is braked and the latter slow down. Thus, the action of the centrifugal force on the intermediate components 7 and on the arms 3 and 4, which is proportional to the speed of rotation, is reduced and the action of the spring 11 becomes noticeable and, acting against the centrifugal force, overcomes the latter; the ends 10 of the intermediate components 7 close up together and the pressure applied by the squeegees 15 against the face of the glass 1 is reduced so that the speed of rotation of the arms 3 and 4 rises automatically; the said phenomenon of braking the arms 3 and 4 takes again place because of the increase of the centrifugal force resulting in speeding up the arms 3 and 4 and the cycle hereinbefore described is repeated.

Consequently, the appropriate selection carried out, by way of experiment, of the weight and of the shape of the movable cleaning element 2, on the one hand, and of the characteristics of the spring 11, on the other hand, enables to achieve automatically the ideal pressure to be applied by the cleaning member 2 on the face of the glass 1 and an adequate speed of rotation of such element around the stem 5, so that the cleaning of the glass 1 is assured for any weather condition.

Thus, it is possible to provide at the free ends of the arms 3 and 4 supplementary wings which may possibly jut out laterally from the glass 1 in order to increase the effect of the centrifugal force on the arms and, consequently, to increase the pressure applied to the cleaning member. Such a mechanism yields a better cleaning efficiency.

By means of the equilibrium established between the centrifugal force and that of the spring 11, the cleaning mechanism hereinbefore described may be easily applied in the case of headlamp glasses having an external relief face.

Indeed, the presence of the relief will automatically brake the rotary motion of the arms 3 and 4; the centrifugal force, together with the pressure applied to the glass 1 by the cleaning member 15, will be reduced or cancelled out if the arms 3 and 4 are stopped, which will enable the cleaning member to pass easily the obstacle provided by the glass relief and to continue its rotation.

Similarly, the cleaning mechanism may also be used for concave or elongated glasses as provided on certain types of vehicles. In the case of a concave glass, it will be sufficient to adapt the shape of the rim of the cleaning element applied against the glass to that of the surface of the latter.

Moreover, the number of arms of the cleaning element may be varied.

The cleaning mechanism may be used both for motor-car headlamps as well as for headlamps of any other type of vehicle, such as a motor-bicycle, etc.

It is also possible to provide a washing system of the headlamps by means of a liquid cleaning agent such as water, for example by means of a pipe run terminating above such glasses, so as to be able to spread the water over the latter in the course of the advancing motion of the vehicle.

It must be well understood that the invention is not limited to the described embodiment and that many changes may be introduced therein without departing from the scope of the present patent application.

I claim:

1. A cleaning mechanism for vehicle headlamps comprising at least one movable cleaning element adapted to move over the outer face of a headlamp glass, means provided to cause the rotation of said cleaning element over the outer face of the headlamp glass by means of the force of the wind against said movable cleaning element caused by the advance movement of the vehicle, said cleaning element
    comprising at least one rotatable arm facing the surface of the headlamp glass, said arm adapted to rotate about an axis of rotation sub-stantially at right angles to the headlamp glass, the side of said arm facing the glass being provided with a cleaning member, said arm being rotatably mounted at one of its ends on a support positioned substantially at the center of the headlamp glass and pivotable relative to said support around a swivelling axis positioned at right angles to said axis of rotation, said swivelling axis being positioned adjacent to one side portion of the end of said arm rotatably mounted on said support, wherein when the arm rotates around the axis of rotation at right angles to the headlamp glass, the cleaning member is applied against said glass by centrifugal force acting on the arm, and further comprising at least one elastic member being provided to cooperate with the other side portion of said end of the arm and acting against said centrifugal force, to reduce the pressure applied by the cleaning member to the headlamp glass.

2. Cleaning mechanism as claimed in claim 1, wherein the cleaning element comprises at least one pair of arms, each one of which carries a cleaning member and extending in the extension of one another.

3. Cleaning mechanism as claimed in claim 2, wherein the swivelling axes of the same pair of arms are substantially parallel and extend on either side of the axis of rotation at right angles to the surface of the headlamp glass, said elastic member connecting said other side portions of said ends of said arms being connected between both of the arms and positioned on either side of the said axis of rotation.

4. Cleaning mechanism as claimed in claim 3, wherein the support comprises a stem extending at right angles to the headlamp glass, the cleaning member being fitted on this stem in such a manner as to be able to rotate around the latter's axis.

5. Cleaning mechanism as claimed in claim 4, wherein the ends directed towards one another of the same pair of arms are hinged on a hub freely mounted on the said supporting stem.

6. Cleaning mechanism as claimed in claim 5, wherein the elastic member cooperates with the ends directed towards one another of the same pair of arms by means of a component integral with each of such ends and extending along the supporting stem, the end of such component located on the side of the cleaning member being hinged on the hub, the other end supporting the elastic member.

7. Cleaning mechanism as claimed in claim 1, wherein at least the arm of the cleaning element is produced in a material permeable to light.

* * * * *